(12) United States Patent
Evulet

(10) Patent No.: US 7,726,114 B2
(45) Date of Patent: Jun. 1, 2010

(54) INTEGRATED COMBUSTOR-HEAT EXCHANGER AND SYSTEMS FOR POWER GENERATION USING THE SAME

(75) Inventor: Andrei Tristan Evulet, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1094 days.

(21) Appl. No.: 11/296,728

(22) Filed: Dec. 7, 2005

(65) Prior Publication Data
US 2007/0125063 A1 Jun. 7, 2007

(51) Int. Cl.
*F02C 3/00* (2006.01)
(52) U.S. Cl. ........................................ 60/39.37; 60/730
(58) Field of Classification Search ................... 60/804, 60/39.511, 39.15, 39.37, 39.52, 39.17, 730
See application file for complete search history.

(56) References Cited

U.S. PATENT DOCUMENTS

| | | | | |
|---|---|---|---|---|
| 3,642,061 | A * | 2/1972 | Waeselynck | 165/111 |
| 4,819,438 | A * | 4/1989 | Schultz | 60/730 |
| 6,260,348 | B1 | 7/2001 | Sugishita et al. | |
| 6,298,664 | B1 * | 10/2001 | Åsen et al. | 60/649 |
| 6,430,916 | B2 | 8/2002 | Sugishita et al. | |
| 6,640,550 | B2 * | 11/2003 | Hoffmann et al. | 60/785 |
| 6,832,485 | B2 | 12/2004 | Sugarmen et al. | |
| 2004/0079082 | A1 * | 4/2004 | Bunker | 60/752 |
| 2005/0126156 | A1 | 6/2005 | Anderson et al. | |

FOREIGN PATENT DOCUMENTS

WO  WO2004072443 A1  8/2004

\* cited by examiner

*Primary Examiner*—Michael Cuff
*Assistant Examiner*—Andrew Nguyen
(74) *Attorney, Agent, or Firm*—Patrick K. Patnode

(57) ABSTRACT

A combustor-heat exchanger system comprising a plurality of cans. Each can includes an inner cylinder and an outer cylinder forming an annular space in between, wherein the inner cylinder is configured to receive and combust a fuel and compressed oxidant to generate heat and a hot gas. The outer cylinder is configured to receive a portion of a gas lean in carbon dioxide from a turbine system and utilize the heat from the inner cylinder to generate a heated gas. The combustor-heat exchanger further includes an inlet volute along the surface of the inner cylinder configured to receive the portion of the gas lean in carbon dioxide and distribute the gas lean in carbon dioxide into an axial flow through the annular space of each can. The combustor-heat exchanger also includes an outlet volute along the surface of the outer cylinder configured to receive the heated gas from each can, a first manifold to distribute the gas lean in carbon dioxide stream into each inlet volute and a second manifold to receive the heated gas from each can and generate a hot discharge stream.

22 Claims, 10 Drawing Sheets

INTEGRATED COMBUSTOR-HEAT EXCHANGER AND SYSTEMS FOR POWER GENERATION USING THE SAME

BACKGROUND

The invention relates generally to power generation and the efficient recovery of carbon dioxide. More particularly, the invention relates to the integration with carbon dioxide separation with efficient heat recovery and oxygen consumption.

Power generation systems that combust fuels containing carbon, for example fossil fuels, produce carbon dioxide ($CO_2$) as a byproduct as carbon is converted to $CO_2$ during the combustion process. Removal or recovery of the carbon dioxide ($CO_2$) from power generation systems, such as from the exhaust of a gas turbine, is generally not economical due to low $CO_2$ content and low (ambient) pressure of the exhaust. Therefore, unfortunately, the exhaust containing the $CO_2$ is typically released to the atmosphere, and does not get captured and sequestered into oceans, mines, oil wells, geological saline reservoirs, and so on.

In any power generation cycle, once the oxidant is compressed for the combustion process, it is desirable to use all chemical energy of the compressed oxidant (that is the oxygen content). In conventional power plants, the exhaust released to the atmosphere typically contains a significant amount of oxygen. Even in power plants that separate $CO_2$ before discharging the exhaust into the atmosphere, the exhaust still contains some amount of oxygen. The $CO_2$ lean stream containing oxygen that is discharged into atmosphere after separation of $CO_2$ is typically at a temperature and oxygen levels, which temperature and oxygen levels are too low for the stream to be used in a combustion process representative of an efficient gas turbine.

Therefore there is a need to effectively separate $CO_2$ and simultaneously utilize the oxygen content in the discharge stream from a power plant to increase the efficiency of the power plant.

BRIEF DESCRIPTION

In one aspect, a combustor-heat exchanger system comprising a plurality of cans. Each can includes an inner cylinder and an outer cylinder forming an annular space in between, wherein the inner cylinder is configured to receive and combust a fuel and compressed oxidant to generate heat and a hot gas. The outer cylinder is configured to receive a portion of a gas lean in carbon dioxide from a turbine system and utilize the heat from the inner cylinder to generate a heated gas. The combustor-heat exchanger further includes an inlet volute along the surface of the inner cylinder configured to receive the portion of the gas lean in carbon dioxide and distribute the gas lean in carbon dioxide into an axial flow through the annular space of each can. The combustor-heat exchanger also includes an outlet volute along the surface of the outer cylinder configured to receive the heated gas from each can, a first manifold to distribute the gas lean in carbon dioxide stream into each inlet volute and a second manifold to receive the heated gas from each can and generate a hot discharge stream.

In another aspect, a power generation system includes a first gas turbine system including a first combustion chamber configured to combust a first fuel stream, one first compressor system configured to supply a first portion of compressed oxidant to the first combustion chamber and a first turbine configured to receive a first discharge from the first combustion chamber and generate a first exhaust and electrical energy. The power generation system further includes a second gas turbine system comprising a second combustion chamber configured to combust a second fuel stream to generate a second discharge, wherein the first compressor system of the first gas turbine system is configured to supply a second portion of compressed oxidant to the second combustion chamber. The second turbine system includes a second turbine configured to receive the second discharge from the second combustion chamber to generate a second exhaust and electrical energy and a second compressor configured to receive the second exhaust comprising carbon dioxide and to discharge a recycle stream to the second combustion chamber and a split stream to a separator system adapted to recover carbon dioxide and generate a exhaust stream lean in carbon dioxide. The second combustion chamber is configured to heat the gas lean in $CO_2$. The second combustion chamber is a combustor-heat exchanger including a plurality of cans each comprising an inner cylinder and an outer cylinder forming an annular space in between, wherein the inner cylinder is configured to receive and combust a portion of the second fuel, the recycle stream and the second portion of compressed oxidant to generate heat and a hot gas. The outer cylinder is configured to receive a portion of the gas lean in carbon dioxide from the second turbine system and utilize the heat from the inner cylinder to generate a heated gas. Each can further includes an inlet volute along the surface of the inner cylinder configured to receive the gas lean in carbon dioxide and distribute a portion of the gas lean in carbon dioxide into an axial flow through the annular space of each can. Each can also includes an outlet volute along the surface of the outer cylinder configured to receive the heated gas from each can. The combustor-heat exchanger includes a first manifold to distribute a portion of the gas lean in carbon dioxide into each inlet volute and a second manifold to receive the heated gas from each can and generate the hot discharge stream to the first turbine.

In yet another aspect, a power generation system includes a first gas turbine system comprising a first compressor system configured to supply a compressed oxidant and a first turbine configured to receive a hot discharge stream and generate a first exhaust and electrical energy. The power generation system further includes a second gas turbine system comprising a combustion chamber configured to combust a fuel stream to generate a discharge, wherein the first compressor of the first gas turbine system is configured to supply said compressed oxidant to the second combustion chamber and a second turbine configured to receive the discharge from the combustion chamber to generate a second exhaust and electrical energy. The second turbine system further includes a second compressor configured to receive the second exhaust comprising carbon dioxide and to discharge a recycle stream to the combustion chamber and a split stream to a separator system adapted to recover carbon dioxide and generate a exhaust stream lean in carbon dioxide. The combustion chamber is configured to receive the exhaust stream lean in carbon dioxide and generate the hot discharge stream to be sent to the first turbine. The combustion chamber includes a combustor-heat exchanger. The combustor-heat exchanger includes a plurality of cans wherein each can comprises an inner cylinder and an outer cylinder forming an annular space in between. The inner cylinder is configured to receive and combust a portion of the fuel and the compressed oxidant to generate heat and a hot gas and the outer cylinder is configured to receive a portion of the from the second turbine system and utilize the heat from the inner cylinder to generate a heated gas. Each can also includes an inlet volute along the surface of the outer cylinder configured to receive the exhaust gas and distribute a portion of the exhaust gas into an axial flow through the annular space of each can and an outlet volute along the surface of the outer cylinder configured to receive the heated exhaust gas from each can. The combustor-heat exchanger further includes a first manifold to distribute a portion of the exhaust gas stream into each inlet volute; and a second manifold to receive the heated exhaust gas from each can and generate the hot discharge stream to the first turbine.

In yet another aspect, a power generation system includes a first gas turbine system. The first gas turbine system includes a first combustion chamber configured to combust a fuel, one first compressor system configured to supply compressed oxidant to the first combustion chamber and a first turbine configured to receive a first discharge from the first combustion chamber and generate a first exhaust and electrical energy. The power generation system further includes a second gas turbine system. The second gas turbine system includes a second combustion chamber configured to combust the first exhaust to generate a second discharge, a second turbine configured to receive the second discharge from the second combustion chamber to generate a second exhaust and a second compressor configured to receive the second exhaust comprising carbon dioxide and to discharge a compressed stream. The power generation system further includes a carbon dioxide separator configured to receive the compressed stream and generate a gas lean in $CO_2$ and a rich carbon dioxide stream. The gas lean in $CO_2$ is heated in the first combustion chamber prior to being recycled into the second combustion chamber. The first combustion chamber is a combustor-heat exchanger and includes a plurality of cans. Each can comprises an inner cylinder and an outer cylinder forming an annular space in between. The inner cylinder is configured to receive and combust a portion of the fuel and compressed oxidant to generate heat and a hot gas and the outer cylinder is configured to receive a portion of the gas lean in carbon dioxide and utilize the heat from the inner cylinder to generate a heated gas. Each can further includes an inlet volute along the surface of the inner cylinder configured to receive the gas lean in carbon dioxide and distribute a portion of the gas lean in carbon dioxide into an axial flow through the annular space of each can and an outlet volute along the surface of the outer cylinder configured to receive the heated gas from each can. The combustor-heat exchanger further includes a first manifold to distribute a portion of the gas lean in carbon dioxide into each inlet volute and a second manifold to receive the heated gas from each can and generate the first discharge stream to the first turbine. The first turbine system and the second turbine systems are configured to be mounted on a single shaft.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present technique provides for two or more exemplary gas turbine systems operating in a power generation system to share a common supply of compressed oxidant. As a result, compression capacity may be freed in one or more of the turbine systems to be employed in the recovery of carbon dioxide ($CO_2$) generated by one or more of the turbine systems. In one example, a compressor in a first turbine system supplies oxidant (via conduits) to a combustion chamber in the first turbine system and also to a combustion chamber in a second turbine system, freeing a compressor in the second turbine system. As discussed below, this freed compression capacity may be employed in the separation and recovery of carbon dioxide ($CO_2$) and other components from the exhaust of one or more of the gas turbines. The recovered $CO_2$ may be sold as product or consumed on-site as feed in other processes, for example. Further, such recovery of $CO_2$ may reduce the amount of $CO_2$ emitted to the environment from the power generation system. The $CO_2$ lean stream generated in this process contains some amount of oxygen, typically lower than the minimum oxygen content required for combustion with a hydrocarbon. In accordance with the present technique, a combustor-heat exchanger advantageously heats the $CO_2$ lean stream up to a temperature, which temperature is sufficient for the $CO_2$ lean steam to be used in the combustion process in the first turbine system. The present technique provides a combustor-heat exchanger configured to have a can-annular system, wherein a gas with lower temperature flowing through an annular space of a can is heated through the combustion process inside the can. While this invention is described in exemplary forms below, these are only examples of possible configurations and are not limitations of this invention.

Figure 1:
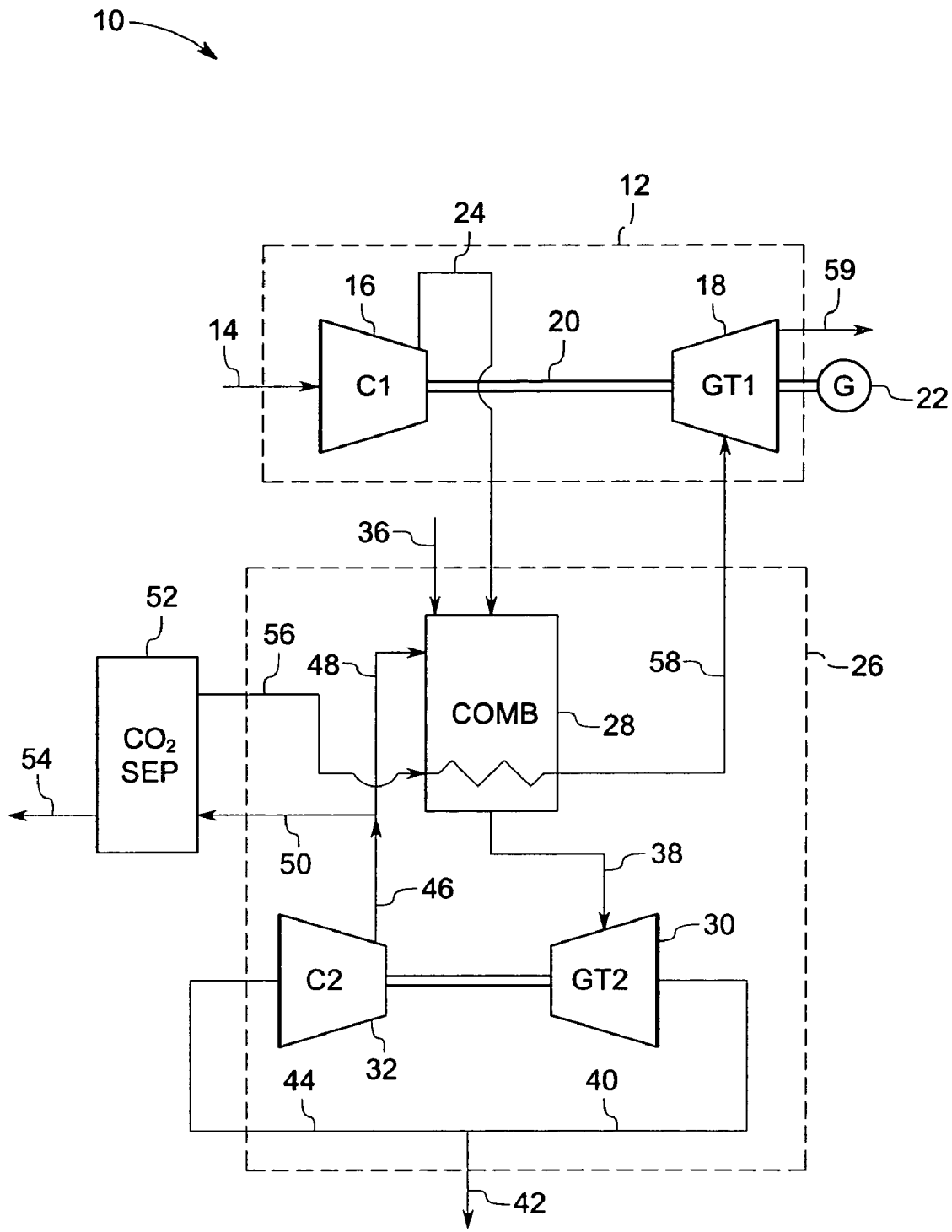
FIG. 1 is a flow diagram of an exemplary integrated power generation system with carbon dioxide separation system in accordance with embodiments of the present technique.

Turning now to the drawings, FIG. 1 illustrates an exemplary power generation system 10 having a first gas turbine system 12 and a second gas turbine system 26 configured for a hydrocarbon feed 36, for example natural gas, propane, etc. In the illustrated embodiment, oxidant is supplied via oxidant conduit 24 from the first gas turbine system 12 to the second gas turbine system 26.

In this example, the first turbine system 12 includes a first compressor 16 configured to supply compressed oxidant 24 to the combustion chamber 28, and a first turbine 18 configured to receive a hot discharge 58 from the combustion chamber 28. The exemplary power generation system 10 may also include a second gas turbine system 26 having the combustion chamber 28 configured to combust the fuel stream (hydrocarbon feed 36), wherein the first compressor 16 of the first gas turbine system 12 is configured to supply oxidant 24 to the combustion chamber 28 for the combustion process. The second turbine system 26 may further include a second turbine 30 configured to receive the discharge 38 from the combustion chamber 28 to generate a second exhaust 40 and electrical energy and a second compressor 32 configured to receive the second exhaust 40 comprising carbon dioxide. The second compressor 32 generates a recycle stream 48 to the combustion chamber 28 and a split stream 50 to a separator system 52 adapted to recover carbon dioxide from the split stream 50.

The second exhaust stream 40 from the second turbine 30 is generally introduced into a moisture separator (not shown) to separate the water 42 formed in the combustion process in the combustion chamber 28. The exit stream 44 from the moisture separator typically includes at least carbon dioxide ($CO_2$), carbon monoxide (CO), nitrogen ($N_2$), oxygen ($O_2$) and unburned hydrocarbon. The exit stream 44 is generally compressed in the second compressor 32 to generate a compressed stream 46. In operation, during the initial phase of operation after start-up, the concentration of $CO_2$ in the compressed stream 46 may not be substantial and hence the entire stream may be recycled back to the combustion chamber 28 as a recycle stream 48. This recycling operation generally increases the $CO_2$ concentration in the compressed stream 46. When the $CO_2$ concentration in the compressed stream 46 reaches a desired level, a slip stream or split stream 50 may be introduced into the downstream $CO_2$ separator unit 52. A control valve configuration (not shown) may be employed to facilitate diversion and introduction of the split stream 50 to the $CO_2$ separator. For example, a control valve may be disposed on the conduit carrying the split stream, and the operation of the control valve tied to an on-line instrument or sensor that measures the concentration $CO_2$ in the compressed stream 46. The downstream $CO_2$ separator unit 52 may generate an exit stream 54 having substantially high concentration of $CO_2$ and a lean $CO_2$ stream 56 primarily having CO, unburned fuel, $O_2$ and $N_2$.

The temperature of the lean $CO_2$ stream 56 may be in the range of about 300 Deg. C. to about 450 Deg. C. In the power generation systems described herein, the combustion chamber 28 uses the combustor-heat exchanger configuration, wherein the incoming compressed oxidant 24, fuel 36 and the recycle stream 48 are burned in a plurality of cans (not shown in FIG. 1) provided in the combustion chamber 28. This combustion process generates heat for heating the $CO_2$ lean stream 56 and generate a hot discharge stream 58. The temperature of the hot discharge stream 58 is about 600 Deg C. to about 750 Deg C. The hot discharge stream 58 is expanded in the first turbine 18 to generate the first exhaust 59 and electrical energy through a generator 22 connected to the first turbine 18. In one embodiment, an additional combustor, which may be a catalytic combustor (not shown in FIG. 1), may be used to boost the temperature of the stream 58 to a higher value before expansion in the turbine 18.

In this exemplary embodiment as depicted in FIG. 1, substantial carbon dioxide isolation is achieved. The carbon dioxide produced in the combustion chamber 28 may be isolated as a concentrated carbon dioxide stream 54 that may be sequestrated or sold in the merchant market depending on the demand for carbon dioxide. The first exhaust stream 59 released into the atmosphere from the first turbine system 12 is substantially $CO_2$ free due to the $CO_2$ compression and isolation achieved in the second turbine system 26. In one embodiment, the first exhaust gas stream 59 comprises mostly of nitrogen and water. In some other embodiments, the first exhaust gas stream 59 also comprises small levels of oxygen that has not been utilized in the combustion processes.

Figure 2:
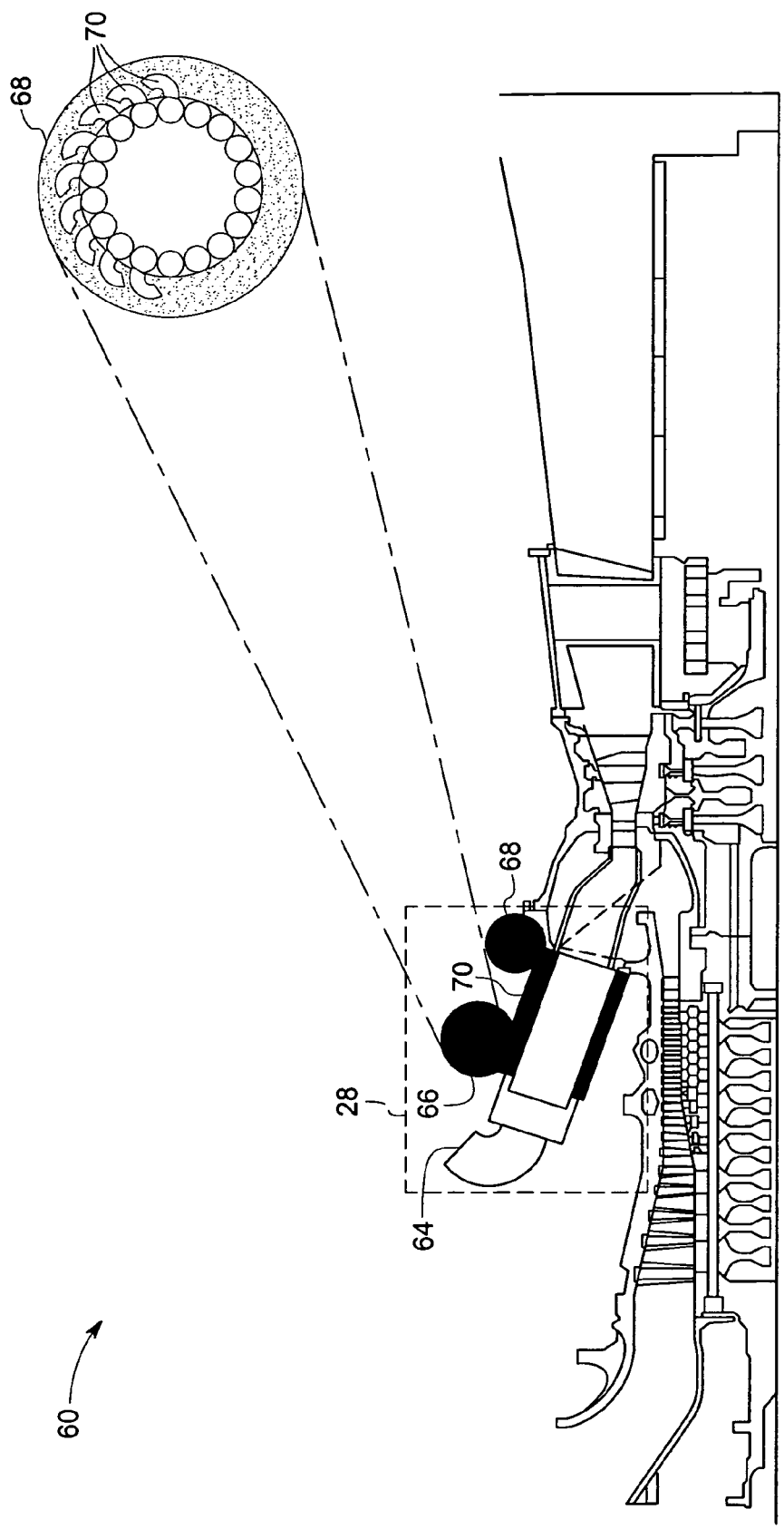
FIG. 2 is a schematic of a gas turbine system including an exemplary combustor-heat exchanger.

FIG. 2 illustrates a schematic of a gas turbine system 60 including an exemplary combustor-heat exchanger 28 as described in the preceding sections. The combustor-heat exchanger 28 includes a plurality of cans 70. The combustor-heat exchanger 28 is configured to receive a gas lean in $CO_2$ from the turbine system 60 and heat the gas lean in $CO_2$ by utilizing the heat generated in a combustion process inside each can 70 and generate a heated gas lean in $CO_2$. Each can 70 is configured to receive a portion of a compressed oxidant through an oxidant inlet 64 and fuel and combust the mixture of the fuel and oxidant inside each can in the combustor-heat exchanger 12 to generate heat and a hot gas. The combustor-heat exchanger 28 includes a first manifold 68 to distribute the gas stream lean in $CO_2$ into each can 70. The combustor-heat exchanger 28 further includes a second manifold 66 to receive the heated gas lean in $CO_2$ from each can 70 and generates a hot discharge stream. A blown-up plan view of the second manifold 66 is illustrated in FIG. 1 including the plurality of the can 70 disposed radially along the perimeter of the circular second manifold 66.

Figure 3:
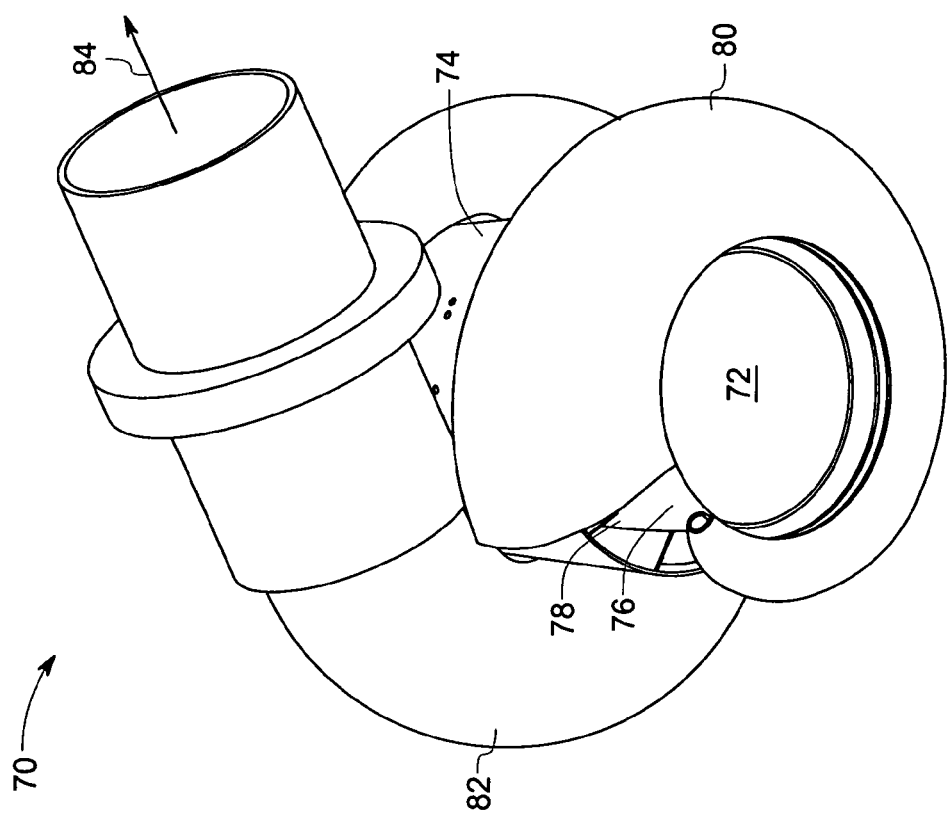
FIG. 3 is an perspective view of an exemplary can of the combustor-heat exchanger.

FIG. 3 shows a perspective view of an exemplary can 70 of the combustor-heat exchanger 28. The can 70 includes an inner cylinder 72 and an outer cylinder 74 forming an annular space 78 in between. The inner cylinder 72 is configured to receive and combust a fuel and compressed oxidant to generate heat and a hot gas. The outer cylinder 74 is configured to receive a portion of the gas lean in $CO_2$ from a turbine system 60 and utilize the heat from the inner cylinder 72 to generate a heated gas lean in $CO_2$. Each can 70 further includes an inlet volute 80 disposed along the surface of the outer cylinder 74 configured to receive the portion of the gas lean in $CO_2$ and distribute the gas into an axial flow through the annular space 78 of each can 70. Each can 70 also includes an outlet volute 82 disposed along the surface of outer cylinder 74 configured to receive the heated gas lean in $CO_2$ from each can 70. The outlet volute 28 is configured to convert the axial flow of the heated gas lean in $CO_2$ into a duct flow 84 in the outlet volute 82.

Figure 4:
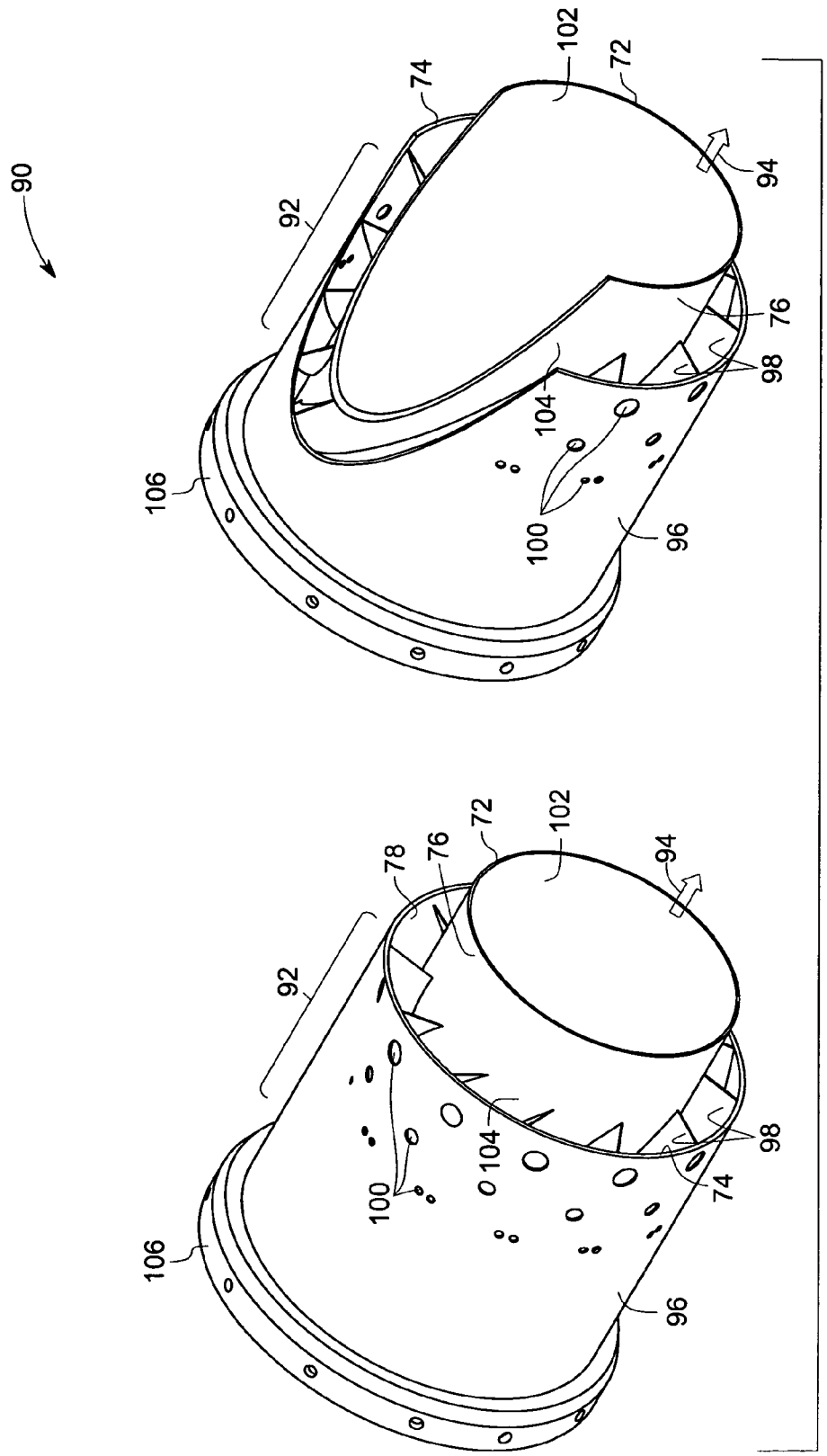
FIG. 4 is a perspective view of an exemplary configuration of the can of the combustor-heat exchanger.

FIG. 4 illustrates a perspective view of an exemplary configuration of the cylinder arrangement 90 of an exemplary can 70 of the combustor-heat exchanger 28. The exemplary arrangement 40 shows only a portion 92 of the can 70, wherein the gas lean in $CO_2$ is introduced into the annular space 78. Similarly at the other end of the can 70 a similar portion is provided (not shown in FIG. 4) for collecting the heated gas lean in $CO_2$ once the gas lean in $CO_2$ flows through the annular space and is heated. The inner cylinder 72 is a hollow cylinder with a passage 102 inside the cylinder, which passage 102 creates the combustion chamber for the incoming products of reaction between oxidant and fuel 94. A portion of the heat generated through the combustion process is utilized to heat the incoming gas lean in $CO_2$ flowing through the annular space 78 disposed between the inner cylinder 72 and the outer cylinder 74. The heat transfer is configured to take place through conduction, convection and radiation from the hot surface 76 of the inner cylinder 72. There are several ways the heat transfer process may be enhanced, such as, providing a plurality of swirling fences 98 disposed within the annular space 78. The swirling fences 98 enhance the heat transfer by increasing the residence time and the surface area of the gas lean in $CO_2$ entering the annular space 78 through the inlet volute 80 (as shown in FIG. 3). The swirling fences 98 also increase the turbulence of the gas flow in the annular space 78, thereby increasing the convective heat transfer. In one embodiment, the heat transfer is further enhanced by increasing the roughness of the outer surface 76 of the inner cylinder 72. The roughness may be increased by many ways including, but not limiting to providing dimples or concavities on the outer surface 76. As shown in FIG. 4, in some other embodiments, the heat transfer may further be enhanced by providing a plurality of impingement holes 100 provided on the surface of the outer cylinder 74.

In operation, a portion of the gas lean in $CO_2$ entering the annular space 78 through the inlet volute 80 (as shown in FIG. 3) is introduced directly into the annular space 78 from the inlet volute 80 and another portion of the gas lean in $CO_2$ is introduced on top of the outer cylinder 74. The portion of the gas that is introduced on top of the outer cylinder 74 is configured to enter the annular space 76 through the impingement holes 100. The impingement holes 100 create firstly an enhanced heat transfer coefficient from the hot surface 72 and secondly a turbulence in the flow of the gas lean in $CO_2$, which turbulence enhances the heat transfer from the inner cylinder 72 to the gas lean in $CO_2$ flowing within the annular space 78.

Figure 5:
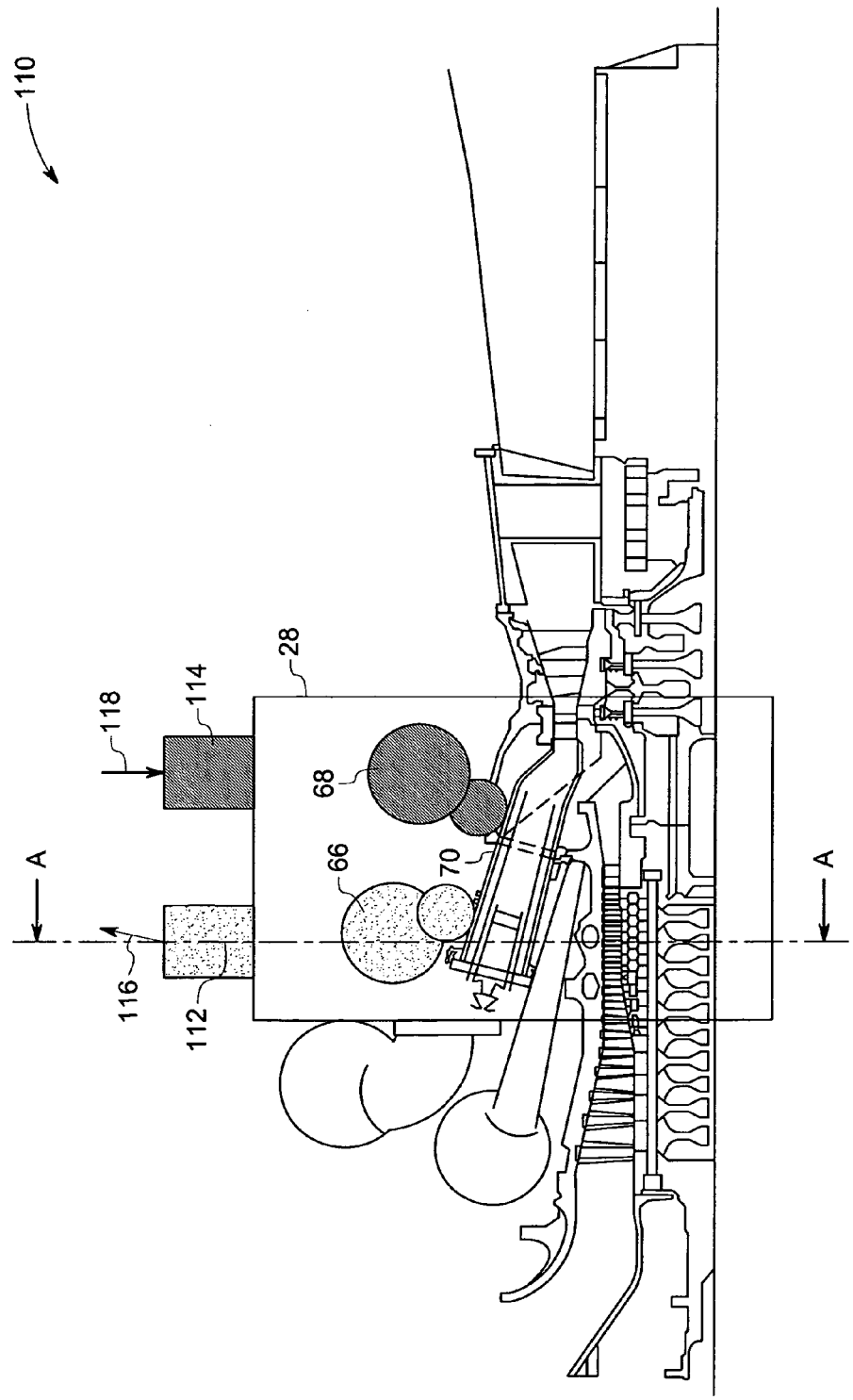
FIG. 5 is yet another schematic view of a turbine system including an exemplary combustor-heat exchanger showing a section line.

FIG. 5 is yet another schematic view 110 of the turbine system 60 including the exemplary combustor-heat exchanger 28 showing a section line AA'. The turbine system 60 comprises the combustor-heat exchanger 28 including a plurality of cans 70. The gas lean in $CO_2$ 118 is introduced into the combustor-heat exchanger 28 through the gas inlet 114 and the heated gas 116 is collected through the heated gas out let 112. The combustor-heat exchanger 28 also includes the first manifold 68 and the second manifold 66. A section is taken from the line AA' along the second manifold 66 and the sectional view is shown in FIG. 6.

Figure 6:
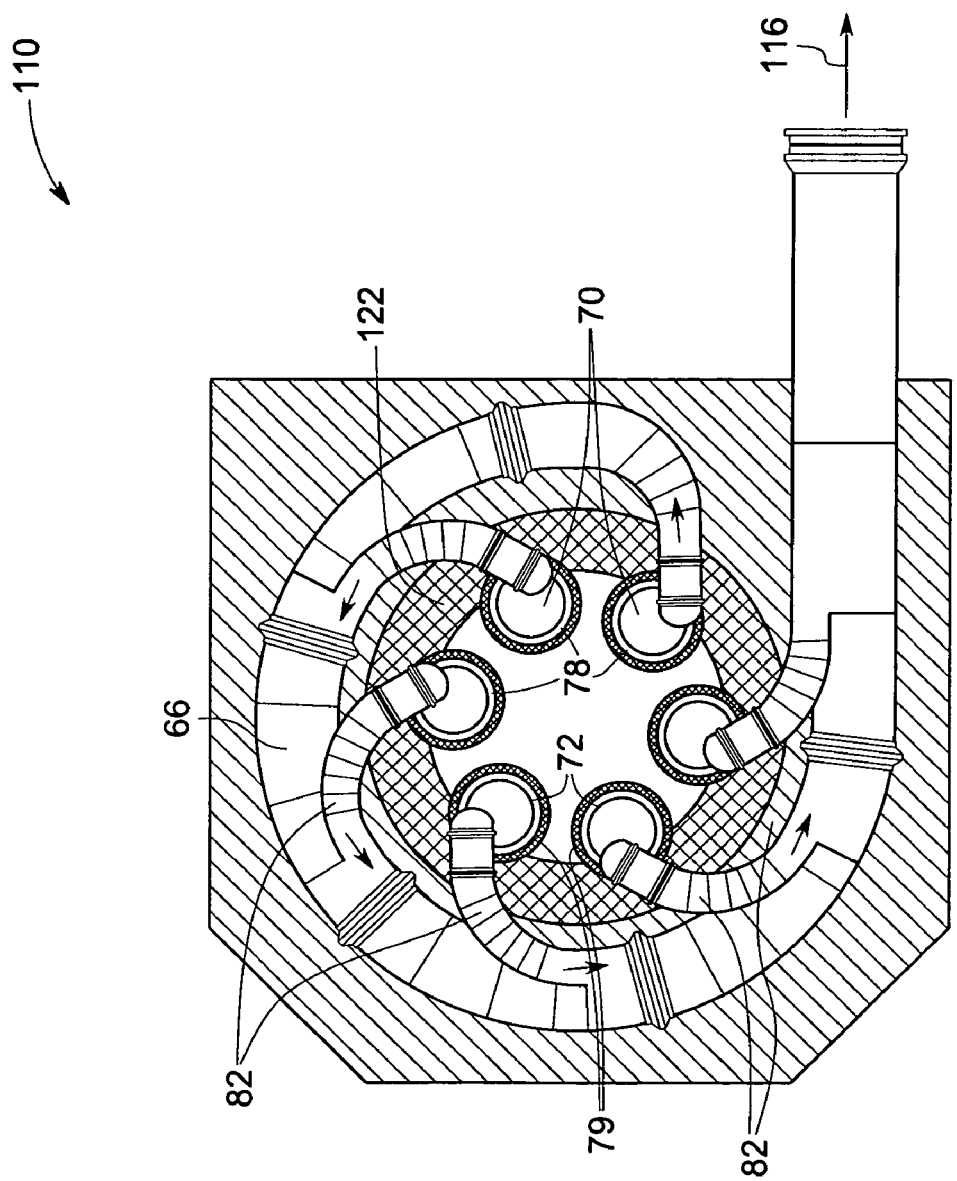
FIG. 6 is a sectional view of the combustor-heat exchanger across the sectional line as shown in FIG. 4.

FIG. 6 is a sectional view 120 of a portion of the combustor-heat exchanger 28 across the sectional line AA' as shown in FIG. 5. The sectional view in FIG. 6 shows only 6 number of cans 70 for the purpose of clarity. However it should be understood that depending on the flow of the gas lean in $CO_2$ and the heat transfer requirement, any number of cans may be included in the combustor-heat exchanger design. Each can 70 comprises the inner cylinder 72, the outer cylinder 74 and the annular space 78 disposed in between. Each can 70 is insulated with a layer of insulation 79. As shown in FIG. 6, each can 70 is connected to the outlet volute 66. As the sectional line is drawn across the hotter side of the cans 70 where the heated gas is collected, only the second manifold 66 is shown. The second manifold 66 collects the heated gas from each of the cans 70 through each of the outlet volutes 82 and generates the hot gas discharge 116. In one embodiment, a layer of insulation 122 is provided to thermally insulate the plurality of cans 70.

The combustor-heat exchangers described in the preceding sections may be advantageously used in several power generation systems that generate a gas lean in $CO_2$. Such a combustor-heat exchanger may be used in a power generation system with more than one turbine systems with carbon dioxide ($CO_2$) isolation. Such a combustor-heat exchanger may also be utilized in a power generation system with multiple turbine systems to efficiently utilize the oxygen content in the exhaust gases released from the power generation system. A few exemplary power generation systems utilizing such a combustor-heat exchanger are described in FIGS. 6-8. It should be understood by any person skilled in the art that many other possible systems may also advantageously use the combustor-heat exchangers described herein.

Figure 7:
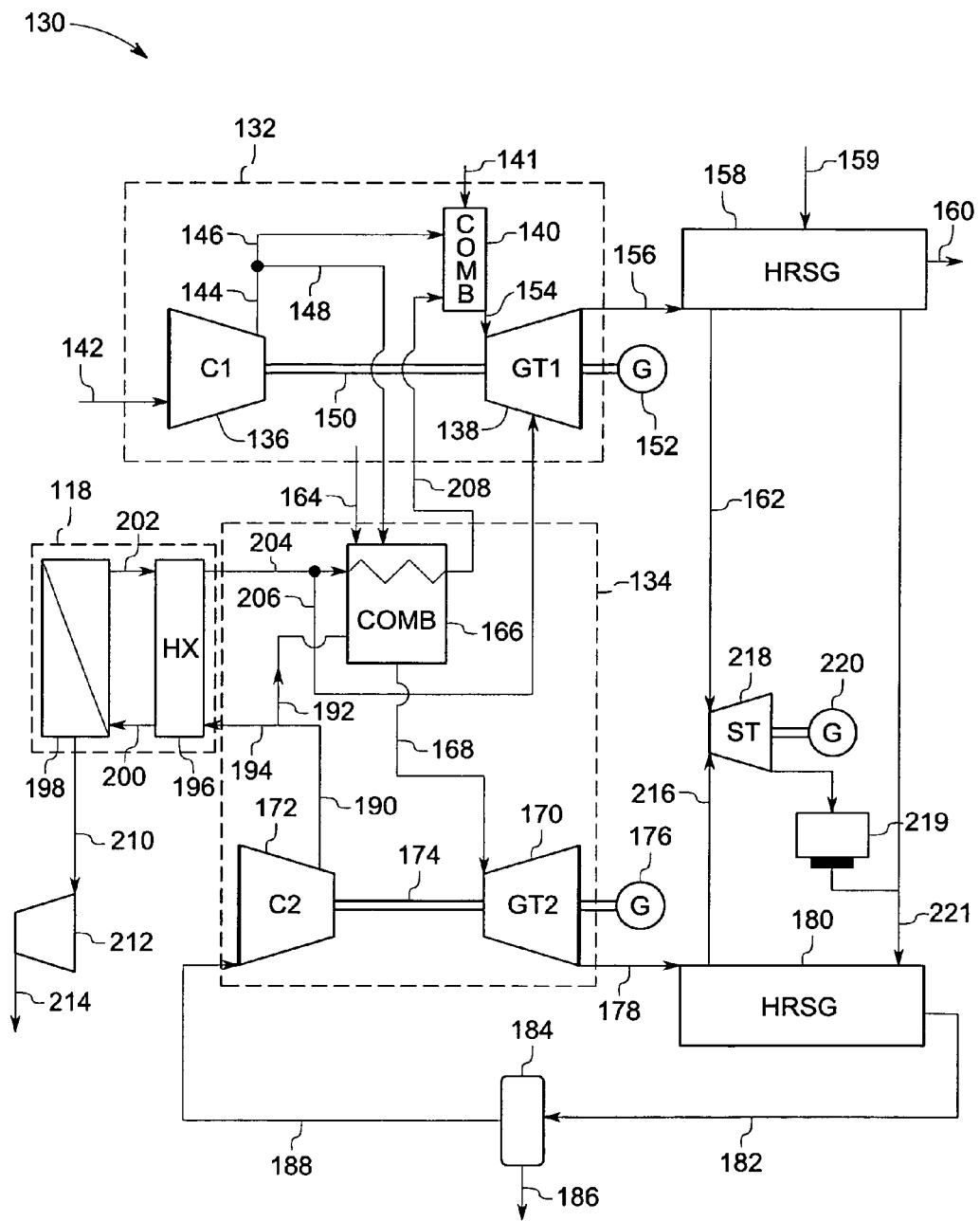
FIG. 7 is a flow diagram of another exemplary integrated power generation system with carbon dioxide separation system in accordance with embodiments of the present technique.

FIG. 7 illustrates another exemplary power generation system 130 having a first gas turbine system 132 configured for a hydrocarbon feed 141 and a second gas turbine system 134 configured for a hydrocarbon feed 164, for example natural gas, propane, etc. In the illustrated embodiment, oxidant is supplied via oxidant conduit 148 from the first gas turbine system 132 to the second gas turbine system 134.

In this example, the first turbine system 132 includes a first combustion chamber 140 configured to combust a first fuel stream (hydrocarbon feed 141), a first compressor 136 configured to supply a first portion of compressed oxidant 146 to the first combustion chamber 140, and a first turbine 136 configured to receive a first discharge 154 from the first combustion chamber 140 and generate a first exhaust 156 and electrical energy. The exemplary power generation system 130 may also include a second gas turbine system 134 having a second combustion chamber 166 configured to combust a second fuel stream (hydrocarbon feed 164), wherein the first compressor 136 of the first gas turbine system 132 is configured to supply oxidant 148 (a second portion of the compressed oxidant 144) to the second combustion chamber 166. The second turbine system 134 may further include a second turbine 170 configured to receive the second discharge 168 from the second combustion chamber 166 to generate a second exhaust 178 and electrical energy and a second compressor 172 configured to receive the second exhaust 178 comprising carbon dioxide and to discharge a recycle stream 192 to the second combustion chamber 166 and a split stream 194 to a separator system 118 adapted to recover carbon dioxide from the split stream 194.

In the illustrated embodiment, the first turbine system 132 typically includes a compressor 136, a turbine 138, a rotor 150, by which rotor 150 turbine 138 drives the compressor 136. The first turbine system 132 also comprises an electrical generator 152, and a first heat recovery steam generator (hereinafter HRSG) 158. Similarly the second turbine system 134 typically includes a compressor 172, a turbine 170, a rotor 174, by which rotor 174 turbine 170 drives the compressor 172. The second turbine system 134 also comprises an electrical generator 176, and a second heat recovery steam generator (hereinafter HRSG) 180.

In operation, exemplary compressors 136 and 172 are multi-stage compressors that include rows of stationary vanes and rotating blades. Compressor 136 inducts an oxidant, such as air 142 and produces a compressed air stream 144. In some embodiments, the compressed air stream 144 is spilt into two streams. A first portion of the compressed air 146 is introduced into the first combustion chamber 140. The first combustion chamber 140 is configured to receive the first fuel stream 141 and the first portion of compressed oxidant 146. The first fuel stream 141 and the oxidant stream 146 may be premixed and injected into the first combustion chamber 140. In some embodiments, the first fuel 141 and the first portion of compressed oxidant 146 may be injected separately into the first combustion chamber 140. In the various embodiments of the power generation systems described herein, the oxidant is ambient air. It is understood that the compressed oxidant 144 from the compressor 136 may comprise any other suitable gas containing oxygen, such as for example, oxygen rich air, oxygen depleted air, and/or pure oxygen. The combustion process in the first combustion chamber 140 generates a first discharge stream 154.

As illustrated, the first discharge stream 154 from the first combustion chamber 140 may be introduced into the first gas turbine 138. As indicated, the power generation system 130 includes a generator 152 attached to the first gas turbine 138. The thermodynamic expansion of the hot first discharge stream 154 fed into the first gas turbine 138 produces power to drive the gas turbine 138, which, in turn, generates electricity through the generator 152. In this embodiment, electricity from the generator 152 may be converted to an appropriate form and is provided to a distribution power supply network grid (not shown). An expanded first exhaust 156 from the first gas turbine 138 may be fed into the first HRSG 158 for recovering the heat content of the expanded first exhaust stream 156. A water stream 159 may be fed into the first HRSG 158, which in turn may generate a first portion of steam 162 at least in part by utilizing the heat recovered from the hot expanded first exhaust stream 156 from the first gas turbine 138. The cooled first exhaust 160 from the first HRSG 158 may be vented into the atmosphere.

As depicted in FIG. 7, a second portion of compressed oxidant 148 from the first compressor 136 is introduced into the second combustion chamber 166 of the second turbine system 134. A second fuel stream 164 is introduced into the second combustion chamber 166 to produce the second discharge stream 168. The second discharge stream 168 is typically expanded in the second turbine 170 to generate the second exhaust stream 178, which exhaust stream 178 may be introduced into the second HRSG 180. In this embodiment, the second HRSG 180 is generally a closed loop HRSG wherein no stream is typically vented into the atmosphere. The heat content of the second exhaust stream 178 may be recovered to produce a second portion of steam 216. The first portion of steam 162 generated in the first HRSG 158 and the second portion of the steam 216 generated in the second HRSG 180 may be used in a steam turbine 218 to produce electrical energy through a generator 220, for example. In one embodiment, a condenser 219 supplies the water 221 for the second HRSG to produce the second portion of steam 216.

The first fuel stream 141 and the second fuel stream 164 may include any suitable hydrocarbon gas or liquid, such as natural gas, methane, naphtha, butane, propane, synthesis gas, diesel, kerosene, aviation fuel, coal derived fuel, bio-fuel, oxygenated hydrocarbon feedstock, and mixtures thereof, and so forth. In one embodiment, the fuel is primarily natural gas (NG) and, therefore, the second discharge stream 168 from the second combustion chamber 166 may include water, carbon dioxide ($CO_2$), carbon monoxide (CO), nitrogen ($N_2$) unburned fuel, oxygen ($O_2$) and other compounds.

The cooled second exhaust stream 182 from the second HRSG 180 is generally introduced into a moisture separator 184 to separate the water formed in the combustion process in the second combustion chamber 166. The exit stream 188 from the moisture separator 184 typically includes at least $CO_2$, CO, $N_2$, $O_2$ and unburned hydrocarbon. The exit stream 188 is generally compressed in the second compressor 172 to generate a compressed stream 190. As discussed in the preceding sections, in operation, during the initial phase of operation after start-up, the concentration of $CO_2$ in the compressed stream 190 may not be substantial and hence the entire stream may be recycled back to the second combustion chamber 166 as a recycle stream 192. This recycling operation generally increases the $CO_2$ concentration in the compressed stream 190. When the $CO_2$ concentration in the compressed stream 190 reaches a desired level, a slip stream or split stream 194 may be introduced into the downstream $CO_2$ separator unit 118. The downstream $CO_2$ separator unit 118 may generate an exit stream 210 having substantially high concentration of $CO_2$ and a lean $CO_2$ stream 204 primarily having CO, $O_2$ unburned fuel and $N_2$.

The temperature of this lean $CO_2$ stream 204 may be in the range of about 300 Deg. C. to about 450 Deg. C. Since $O_2$ and the unburned fuel are present in this stream, it is desirable to utilize the chemical content of this stream (that is the $O_2$ and the fuel content) in a combustion process. In the power generation systems illustrated in FIG. 7, the second combustion chamber 166 uses the combustor-heat exchanger configuration described in the preceding sections. The second combustion chamber 166 is configured to operate as a combustor-heat exchanger wherein the incoming compressed oxidant 148, fuel 164 and the recycle stream 192 are burned in a plurality of cans 20 (not shown in FIG. 6) provided in the second combustion chamber 166. This combustion process generates heat for heating the $CO_2$ lean stream 204 and a hot discharge stream 208. The temperature of the hot discharge stream 208 is about 600 Deg C. to about 750 Deg C. The hot discharge stream 208 is introduced into the first combustion chamber 140 to utilize the $O_2$ and the fuel content of the hot discharge stream 208. The $CO_2$ lean stream 204 is required to reach a certain temperature before it can be introduced to the first combustion chamber 140 and the second combustor chamber 166 advantageously utilizes the configuration of the combustor-heat exchanger design to increase the temperature of the $CO_2$ lean stream 204 and makes it suitable for the direct injection into the first combustion chamber 140. Since the hot discharge stream 208 from the second combustion chamber 166 comprises $O_2$, the first portion of fresh oxidant 146, such as air may be controlled in such a way that the minimum amount of the compressed oxidant 144 is sent to the first combustion chamber 140 to get the combustion a process started and subsequent oxygen for the combustion process in the first combustion chamber 140 is supplied by the oxygen content in the hot discharge steam 208. In this configuration, the maximum amount of compressed oxidant may be sent to the second combustion chamber 166 directly via compressed oxidant stream 148. In this process, the maximum utilization of the oxygen content in the hot discharge stream 208 is achieved and the first cooled exhaust 160 released from the first HRSG 158 is substantially free of both $CO_2$ and $O_2$. In some embodiments, the $CO_2$ lean stream 204 from the $CO_2$ separator 118 is split into two streams. A first portion 205 is sent through the second combustion chamber 166 to be heated and introduced into the first combustion chamber 140 as 208. A second portion 206 is sent directly to the first gas turbine 138 to cool the liner of the first turbine 138. In conventional power generation systems, fresh compressed oxidant is typically used to cool the turbine liners and using a portion of the $CO_2$ lean gas 206 in this cooling process increases the overall efficiency of the power generation system 130.

As shown in the embodiment of FIG. 7, the $CO_2$ separator unit 118 includes a heat exchanger 196 and a $CO_2$ separator 198. The carbon dioxide separator 198 may apply various techniques known in the art, including but not limited to pressure swing adsorption, chemical absorption and membrane separation, and so forth to separate the $CO_2$ from the split stream 194. The split stream 194 is introduced into the heat exchanger 196 to reduce the temperature and produce a cooled split stream 200. In one embodiment, the split stream 194 typically comprises at least about 10% $CO_2$ by volume. The cooled split stream 200 is introduced in the $CO_2$ separator 198 to generate a $CO_2$ rich stream 210 and a $CO_2$ lean stream 202. As described earlier, the $CO_2$ lean stream 202 further comprises CO, $N_2$, $O_2$ and un-reacted fuel. The $CO_2$ lean stream 202 is introduced in the heat exchanger 196 to recover the heat content in the split stream 194 and generate a lean $CO_2$ stream 204.

Pressure swing adsorption (PSA) may be used for separation of carbon dioxide from a mixture of gases. In PSA techniques, at a high partial pressure, solid molecular sieves can adsorb carbon dioxide more strongly than other gases. As a result, at elevated pressures, carbon dioxide is removed from the mixture of gases this mixture is passed through an adsorption bed. Regeneration of the bed is accomplished by depressurization and purging. Typically for critical operations, a plurality of adsorption vessels is used for continuous separation of carbon dioxide, wherein one adsorption bed is used while the others are regenerated.

Another technique for separation of carbon dioxide from a gas stream is chemical absorption using oxides, such as, calcium oxide (CaO) and magnesium oxide (MgO) or a combination thereof. In one embodiment, at elevated pressure and temperature, $CO_2$ is absorbed by CaO forming calcium carbonate ($CaCO_3$), thereby removing $CO_2$ from the gas mixture. The sorbent CaO is regenerated by calcinations of $CaCO_3$, which can again reform $CaCO_3$ to CaO.

Membrane separation technology may also be used for separation of carbon dioxide from a gas stream. Membrane processes are generally more energy efficient and easier to operate than absorption processes. The membranes used for high temperature carbon dioxide separation include zeolite and ceramic membranes, which are selective to $CO_2$. However, the separation efficiency of membrane technologies is low, and complete separation of carbon dioxide may not be achieved through membrane separation. Typically, membrane separators work more efficiently at higher pressures, and use of a membrane separator to separate the carbon dioxide from the split stream 194 from the second compressor 172 is facilitated by the elevated pressure achieved through the compression in the second compressor 172. The higher pressure available for the separation of $CO_2$ from the split stream 194 also reduces the size of the $CO_2$ separator 198, thereby enhancing the feasibility and the economics of the $CO_2$ separation process.

Yet another technique used for separation of $CO_2$ from the split stream 194 may include, but is not limited to, chemical absorption of $CO_2$ using amines. The split stream 194 may be cooled to a suitable temperature to use chemical absorption of carbon dioxide using amines. This technique is based on alkanol amines solvents that have the ability to absorb carbon dioxide at relatively low temperatures, and are easily regenerated by raising the temperature of the rich solvents. A carbon dioxide rich stream 86 is obtained after regeneration of the rich solvent. The solvents used in this technique may include triethanolamine, monoethanolamine, diethanolamine, diisopropanolamine, diglycolamine, and methyldiethanolamine. Another technique for separating $CO_2$ may be physical absorption. It may be noted that all or combination of any of the techniques described above for $CO_2$ separation may be used to separate $CO_2$ advantageously In this exemplary embodiment as depicted in FIG. 7, substantial carbon dioxide isolation is achieved. The carbon dioxide produced in the second combustion chamber 166 may be isolated as a concentrated carbon dioxide stream 210 that may be sequestrated or sold in the merchant market depending on the demand for carbon dioxide. In one embodiment, the concentrated $CO_2$ stream 210 may be sent to a compressor 212 to compress it further to a compressed $CO_2$ rich stream 214.

Figure 8:
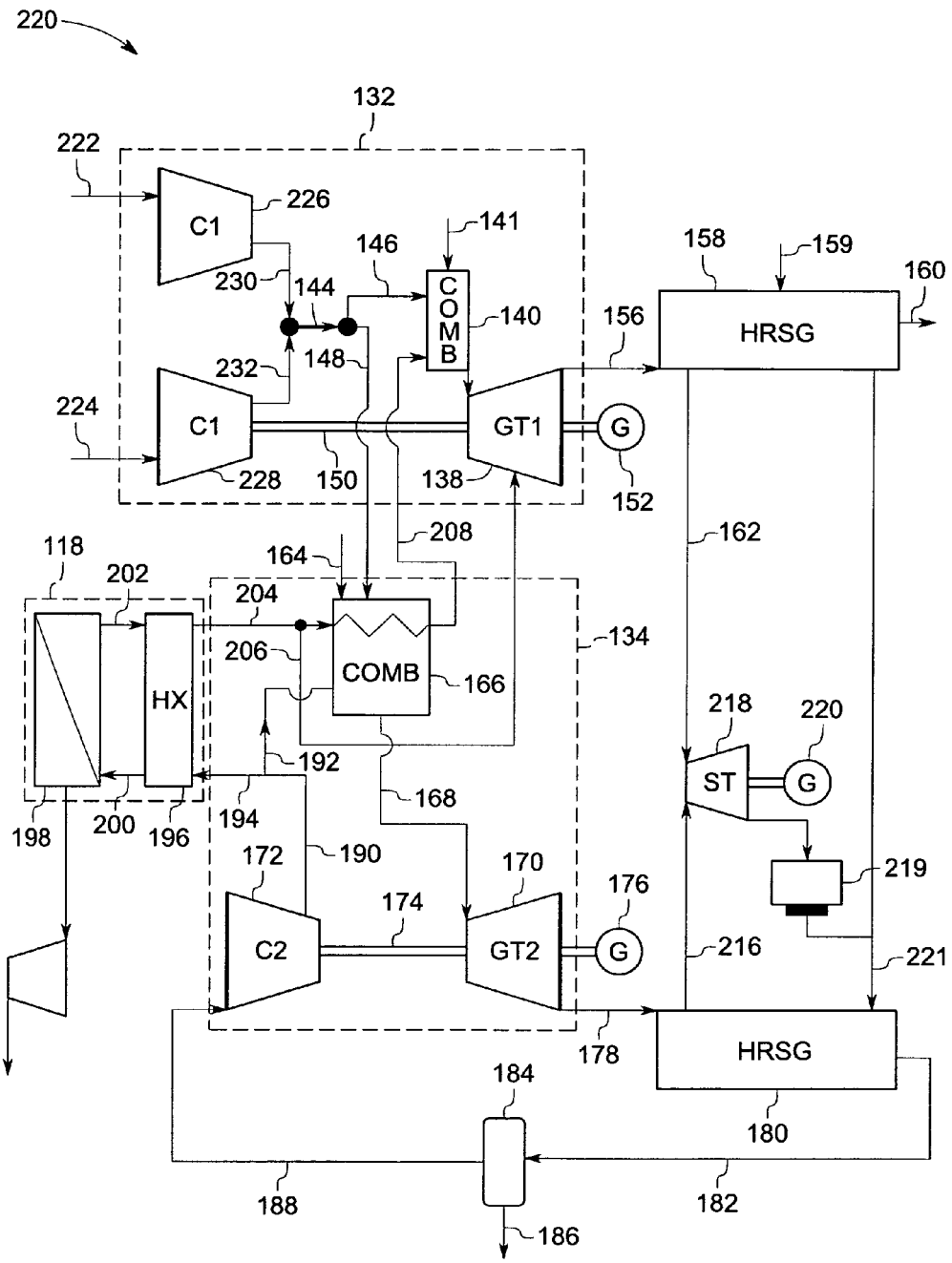
FIG. 8 is a flow diagram of yet another exemplary power generation system with carbon dioxide separation system in accordance with embodiments of the present technique.

FIG. 8 illustrates another exemplary power generation system 220, in which system like features are designated with like reference numerals. The only difference in the power generation system 220 as illustrated in FIG. 8 and the system 130 illustrated in FIG. 7, is the compressor arrangement in the first turbine system 132. In the embodiment shown in FIG. 8, the first turbine system 132 includes two compressors 226 and 228 working in tandem. The first compressor 226 is configured to receive fresh oxidant 222 and generate a compressed oxidant stream 230. Similarly the second compressor 228 is configured to receive fresh oxidant 224 and generate a compressed oxidant stream 232. The advantage of having two compressors to supply the compressed oxidant required for both the turbine systems gives an additional flexibility and better control to divert the required amount of oxidant to the first and second combustions chambers 140 and 166 respectively.

Figure 9:
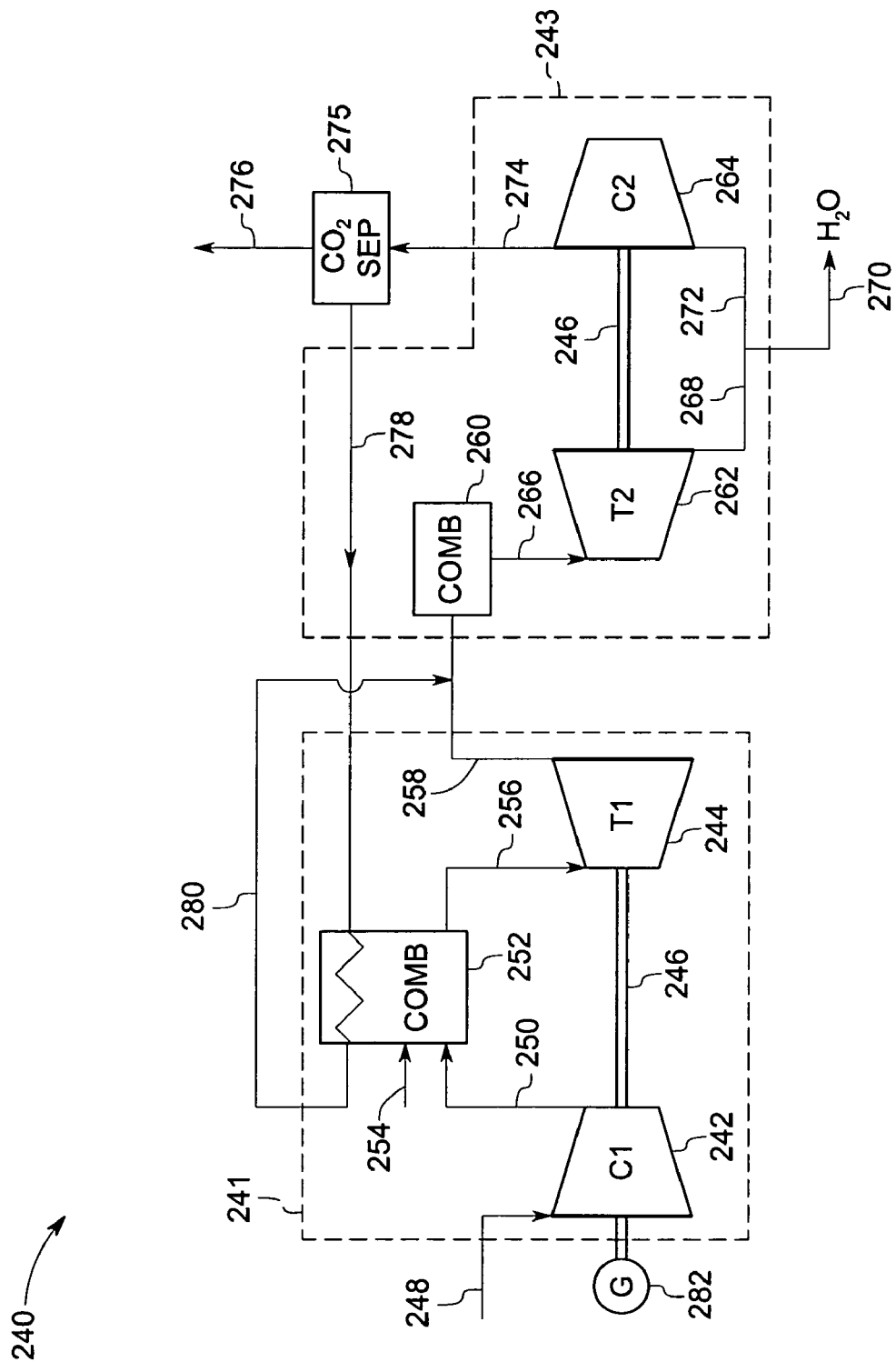
FIG. 9 is a flow diagram of yet another exemplary power generation system with embodiments of the present technique.

FIG. 9 illustrates yet another exemplary power generation system 240. The power generation system 240 includes a first gas turbine system 241 and a second gas turbine system 243 configured for a hydrocarbon feed 254, for example natural gas, propane, etc.

In this example, the first turbine system 241 includes a first compressor 242 configured to supply compressed oxidant 250 to the first combustion chamber 252. The first combustion chamber 252 is configured to receive the fuel 254 and the compressed oxidant 250 to generate a first hot discharge 256. The power generation system 240 further includes a first turbine 244 configured to receive the first hot discharge 256 from the first combustion chamber 252, and generate a first exhaust stream 258. As shown in FIG. 9, the exemplary power generation system 240 may also include a second gas turbine system 243 having a second combustion chamber 260 configured to combust the first exhaust stream 258. The second turbine system 243 may further include a second turbine 264 configured to receive the second discharge 266 from the second combustion chamber 260 to generate a second exhaust 268. The second turbine system 243 further includes a second compressor 264 configured to receive the second exhaust 268 comprising carbon dioxide. In some embodiment, the moisture content of the second exhaust stream 268 is separated to generate a moisture free stream 272. The moisture free stream 272 is introduced into the second compressor 264. The second compressor 264 generates a compressed stream 274, which compressed stream 274 is sent to a $CO_2$ separator 275. The $CO_2$ separator 275 separates $CO_2$ from the compressed stream 274 to generate a $CO_2$ rich stream 276 and a gas lean in $CO_2$ 278. The gas lean in $CO_2$ 278 is sent to the first combustion chamber 252 to recover the heat of combustion to raise the temperature of the gas lean in $CO_2$ 278. The first combustion chamber 252 is a combustor-heat exchanger described in the preceding sections. The heated $CO_2$ lean stream 280 is recycled back to the second combustion chamber 260 to utilize the oxygen content in the heated $CO_2$ lean stream 280. In the exemplary power generation system 240, the first turbine system 241 and the second turbine system 243 are mounted on the same shaft 246 to generate electricity through a generator 282 connected to the first turbine system 241.

The exemplary combustor-heat exchangers and the power generation systems including the same as described herein have several advantages. The combustor-heat exchanger facilitates the heating of the lean $CO_2$ stream from a turbine system, which lean $CO_2$ stream then can be injected into a combustion process to utilize the oxygen and the fuel content, or may be sent to the turbine directly to produce electrical energy. The higher pre-heat temperatures of the $CO_2$ lean stream balances out the lower oxygen content disadvantage typically resulting in combustor instabilities and poor operation (for example, flameout propensity). The second advantage is that by operating the combustor-heat exchanger at higher stoichiometries in order to partially supply some of the heat to the $CO_2$ lean stream, the $CO_2$ content of the combustion gases is increased, thus minimizing the recycling fraction needed for $CO_2$ separation.

Figure 10:
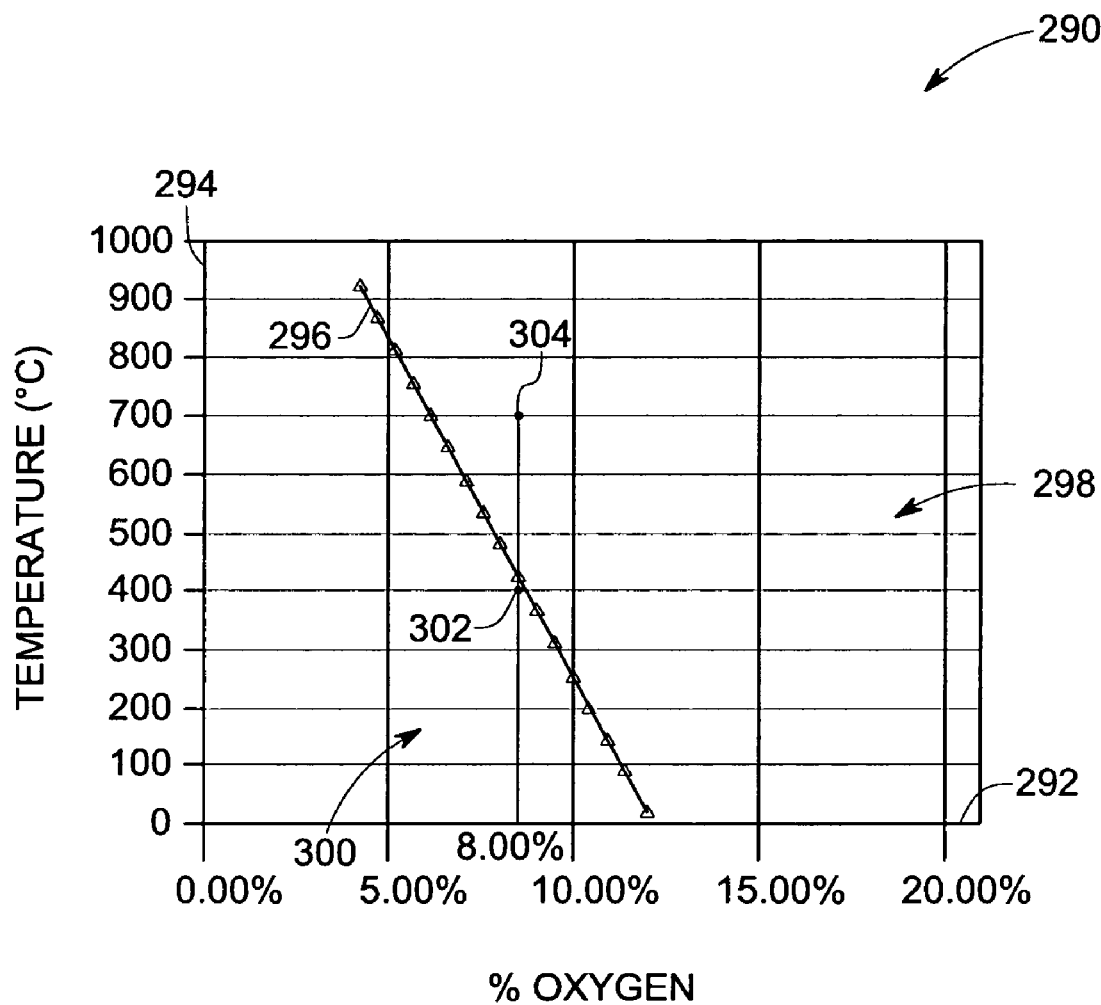
FIG. 10 is a plot showing the flammable zone where minimum oxygen content is plotted against temperature.

FIG. 290 illustrates the flammable zone in a combustor. As shown in FIG. 10, the oxygen content in the feed to a combustor is plotted in the horizontal axis 292 and the temperature (T) is plotted on the vertical axis 294. The line 296 determines the flammability line for any particular oxygen content in the feed to the combustor. The zone 298 on the right hand side of the flammability line 296 determines the flammable zone. For example, as shown in the graph, a stream containing 8% $O_2$ and preheated at 400 Deg. C. may not be able to burn as the operating point 302 is on the left hand side zone 300 of the flammability line 296. However when preheated to 700 Deg. C., the same stream containing 8% $O_2$ may be combusted as the operating point 304 shifts to the flammable zone 298.

The exemplary power generation systems also facilitate cleaner power generation along with $CO_2$ separation. The only exhaust stream released into the ambient from the system is the cooled first exhaust stream from the first HRSG, which cooled first exhaust stream is substantially free of $CO_2$. Therefore lower emission is achieved through this power generation system. The $CO_2$ generated in the process of combustion in the combustor heat exchanger is separated using a $CO_2$ separator and the separated $CO_2$ can be suitable sequestered for oil recovery or sold in the merchant market depending on the demand for carbon dioxide. A part of the $CO_2$ lean stream may also used in cooling the first turbine, further enhancing the overall efficient of the plant.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A combustor-heat exchanger system comprising:
a plurality of cans each comprising:
an inner cylinder and an outer cylinder forming an annular space in between, wherein said inner cylinder is configured to receive and combust a fuel and compressed oxidant to generate heat and a hot gas and said outer cylinder is configured to receive a portion of a gas lean in carbon dioxide from a turbine system and utilize said heat from said inner cylinder to generate a heated gas;
an inlet volute along the surface of said inner cylinder configured to receive said portion of said gas lean in carbon dioxide and distribute said gas lean in carbon dioxide into an axial flow through said annular space of each said can; and
an outlet volute along the surface of said outer cylinder configured to receive said heated gas from each said can;
a first manifold to distribute said gas lean in carbon dioxide stream into said each inlet volute; and
a second manifold to receive said heated gas from each said can and generate a hot discharge stream.

2. The system of claim 1, wherein said compressed oxidant is generated in a first turbine system.

3. The system of claim 1, wherein said combustor-heat exchanger is an integral part of a second turbine system.

4. The system of claim 1, wherein said fuel is selected from the group consisting of natural gas, methane, methanol, ethanol, a stream comprising naphtha, butane, propane, diesel, kerosene, an aviation fuel, a coal derived fuel, a bio-fuel, an oxygenated hydrocarbon feedstock, and mixtures thereof.

5. The system of claim 1, wherein said fuel comprises natural gas.

6. The system of claim 1, wherein said oxidant is selected from a group consisting of air, oxygen rich air, oxygen depleted air, and pure oxygen.

7. The system of claim 1, wherein said oxidant is air.

8. The system of claim 1, wherein said gas lean in carbon dioxide stream is heated from about 350 Deg. C. to about 800 Deg. C. in said combustor-heat exchanger.

9. The system of claim 1, wherein said gas lean in carbon dioxide comprises at least 6 weight percent oxygen.

10. The system of claim 1, wherein said outer cylinder is configured to have impingement hole on the surface, said impingement holes in fluid communication with said annular space.

11. The system of claim 1, wherein said annular space is configured to have swirling fences to enhance heat transfer and increase residence time of said gas lean in carbon dioxide.

12. The system of claim 1, wherein said inner cylinder is configured to have a rough surface to enhance heat transfer.

13. The system of claim 1, wherein said rough surface comprises a plurality of concavities.

14. The system of claim 13, wherein said concavities are selected from the group consisting of depressions, indentations, dimples and pits.

15. A power generation system comprising:
a first gas turbine system comprising:
a first combustion chamber configured to combust a first fuel stream;
one first compressor system configured to supply a first portion of compressed oxidant to said first combustion chamber; and
a first turbine configured to receive a first discharge from said first combustion chamber and generate a first exhaust and electrical energy; and
a second gas turbine system comprising:
a second combustion chamber configured to combust a second fuel stream to generate a second discharge, wherein said first compressor system of said first gas turbine system is configured to supply a second portion of compressed oxidant to said second combustion chamber; and
a second turbine configured to receive said second discharge from said second combustion chamber to generate a second exhaust and electrical energy; and
a second compressor configured to receive said second exhaust comprising carbon dioxide and to discharge a recycle stream to said second combustion chamber and a split stream to a separator system adapted to recover carbon dioxide and generate a exhaust stream lean in carbon dioxide;
wherein said second combustion chamber is configured to heat said gas lean in CO2, said second combustion chamber comprising a combustor-heat exchanger comprising:
a plurality of cans each comprising:
an inner cylinder and an outer cylinder forming an annular space in between, wherein said inner cylinder is configured to receive and combust a portion of said second fuel, said recycle stream and said second portion of compressed oxidant to generate heat and a hot gas and said outer cylinder is configured to receive a portion of said gas lean in carbon dioxide from said second turbine system and utilize said heat from said inner cylinder to generate a heated gas;
an inlet volute along the surface of said inner cylinder configured to receive said gas lean in carbon dioxide and distribute a portion of said gas lean in carbon dioxide into an axial flow through said annular space of each said can; and
an outlet volute along the surface of said outer cylinder configured to receive said heated gas from each said can;

a first manifold to distribute a portion of said gas lean in carbon dioxide into said each inlet volute; and
a second manifold to receive said heated gas from each said can and generate said hot discharge stream to said first turbine.

16. The system of claim 15, wherein said separator system comprises a heat exchanger configured to recover heat from said split stream and a carbon dioxide separator configured to generate a carbon dioxide rich stream and said gas lean in carbon dioxide.

17. The system of claim 16, wherein the heat exchanger comprises a cross-exchanger configured to recover heat from the split stream in exchange with the carbon dioxide lean stream from the carbon dioxide separator.

18. The system of claim 16, wherein the carbon dioxide separator comprises a membrane unit.

19. The system of claim 15, further comprising a first heat recovery steam generator configured to recover heat from the first exhaust and generate a first portion of steam and a second heat recovery steam generator configured to recover heat from the second exhaust and generate a second portion of steam.

20. The system in claim 15, wherein said first compressor system comprises more than one compressor.

21. A power generation system comprising:
a first gas turbine system comprising:
a first compressor system configured to supply a compressed oxidant; and
a first turbine configured to receive a hot discharge stream and generate a first exhaust and electrical energy; and
a second gas turbine system comprising:
a combustion chamber configured to combust a fuel stream to generate a discharge, wherein said first compressor of said first gas turbine system is configured to supply said compressed oxidant to said second combustion chamber;
a second turbine configured to receive said discharge from said combustion chamber to generate a second exhaust and electrical energy; and
a second compressor configured to receive said second exhaust comprising carbon dioxide and to discharge a recycle stream to said combustion chamber and a split stream to a separator system adapted to recover carbon dioxide and generate a exhaust stream lean in carbon dioxide;
wherein said combustion chamber is configured to receive said exhaust stream lean in carbon dioxide and generate said hot discharge stream to be sent to said first turbine, said combustion chamber comprising a combustor-heat exchanger comprising:
a plurality of cans each comprising:
an inner cylinder and an outer cylinder forming an annular space in between, wherein said inner cylinder is configured to receive and combust a portion of said fuel and said compressed oxidant to generate heat and a hot gas and said outer cylinder is configured to receive a portion of said from said second turbine system and utilize said heat from said inner cylinder to generate a heated gas;
an inlet volute along the surface of said outer cylinder configured to receive said exhaust gas and distribute a portion of said exhaust gas into an axial flow through said annular space of each said can; and
an outlet volute along the surface of said outer cylinder configured to receive said heated exhaust gas from each said can;
a first manifold to distribute a portion of said exhaust gas stream into said each inlet volute; and
a second manifold to receive said heated exhaust gas from each said can and generate said hot discharge stream to said first turbine.

22. A power generation system comprising:
a first gas turbine system comprising:
a first combustion chamber configured to combust a fuel;
one first compressor system configured to supply compressed oxidant to said first combustion chamber; and
a first turbine configured to receive a first discharge from said first combustion chamber and generate a first exhaust and electrical energy; and
a second gas turbine system comprising:
a second combustion chamber configured to combust said first exhaust to generate a second discharge;
a second turbine configured to receive said second discharge from said second combustion chamber to generate a second exhaust; and
a second compressor configured to receive said second exhaust comprising carbon dioxide and to discharge a compressed stream;
wherein, said first turbine system and said second turbine systems are configured to be mounted on a single shaft; and
a carbon dioxide separator configured to receive said compressed stream and generate a gas lean in CO2 and a rich carbondioxide stream;
wherein said gas lean in CO2 is heated in said first combustion chamber prior to being recycled into said second combustion chamber, said first combustion chamber comprising a combustor-heat exchanger comprising:
a plurality of cans each comprising:
an inner cylinder and an outer cylinder forming an annular space in between, wherein said inner cylinder is configured to receive and combust a portion of said fuel and compressed oxidant to generate heat and a hot gas and said outer cylinder is configured to receive a portion of said gas lean in carbon dioxide and utilize said heat from said inner cylinder to generate a heated gas;
an inlet volute along the surface of said inner cylinder configured to receive said gas lean in carbon dioxide and distribute a portion of said gas lean in carbon dioxide into an axial flow through said annular space of each said can; and
an outlet volute along the surface of said outer cylinder configured to receive said heated gas from each said can;
a first manifold to distribute a portion of said gas lean in carbon dioxide into said each inlet volute; and
a second manifold to receive said heated gas from each said can and generate said first discharge stream to said first turbine.

* * * * *

UNITED STATES PATENT AND TRADEMARK OFFICE
CERTIFICATE OF CORRECTION

PATENT NO. : 7,726,114 B2
APPLICATION NO. : 11/296728
DATED : June 1, 2010
INVENTOR(S) : Evulet It is certified that error appears in the above-identified patent and that said Letters Patent is hereby corrected as shown below:

In Fig. 6, Sheet 6 of 10, delete "110" and insert -- 120 --, therefor.

In Column 12, Line 64, delete "FIG." before "290".

In Column 15, Line 58, in Claim 21, delete "of said" before "from said".

Signed and Sealed this

Twenty-third Day of November, 2010

David J. Kappos
*Director of the United States Patent and Trademark Office*